(12) United States Patent
Corley et al.

(10) Patent No.: US 6,399,803 B1
(45) Date of Patent: Jun. 4, 2002

(54) PROCESS FOR SEPARATING A TRIGLYCERIDE COMPRISING A DOCOSAHEXAENOIC ACID RESIDUE FROM A MIXTURE OF TRIGLYCERIDES

(75) Inventors: David G. Corley, Pranginf (CH); Samuel G. Zeller, San Diego, CA (US); James P. Doom, St. Peters; Kevin L. Duffin, Manchester, both of MO (US)

(73) Assignee: Omegatech, Inc., Boulder, CO (US)

( * ) Notice: Subject to any disclaimer, the term of this patent is extended or adjusted under 35 U.S.C. 154(b) by 0 days.

(21) Appl. No.: 09/507,718

(22) Filed: Feb. 17, 2000

Related U.S. Application Data

(60) Provisional application No. 60/121,734, filed on Feb. 26, 1999.

(51) Int. Cl.$^7$ ................................................. C11B 3/00
(52) U.S. Cl. ..................................................... 554/191
(58) Field of Search .......................................... 554/191

(56) References Cited

U.S. PATENT DOCUMENTS

| | | | |
|---|---|---|---|
| 4,497,710 A | 2/1985 | Wagu et al. ................. | 210/635 |
| 4,961,881 A | 10/1990 | Ou ........................... | 260/428.5 |
| 5,102,582 A | 4/1992 | Zinnen ...................... | 554/190 |
| 5,130,449 A | 7/1992 | Lagarde et al. ............ | 554/186 |
| 5,179,219 A | 1/1993 | Priegnitz .................... | 554/193 |
| 5,225,580 A | 7/1993 | Zinnen ........................ | 554/30 |
| 5,614,393 A | 3/1997 | Thomas et al. ............. | 435/134 |
| 5,672,726 A | 9/1997 | Ryu et al. .................... | 554/20 |
| 5,719,302 A | 2/1998 | Perrut et al. ................ | 554/191 |
| 5,777,141 A | 7/1998 | Brunner et al. ............. | 554/175 |
| 5,840,181 A | 11/1998 | Patton et al. ............ | 210/198.2 |
| 5,840,944 A | 11/1998 | Furihata et al. ............. | 554/175 |

FOREIGN PATENT DOCUMENTS

| | | | | |
|---|---|---|---|---|
| EP | 0 576 191 | 12/1993 | ............. | C11C/1/00 |
| EP | 0 644 157 | 3/1995 | ........... | C01B/33/21 |
| EP | 644157 | * 3/1995 | | |
| JP | 09 030963 | 2/1997 | .......... | A61K/31/23 |
| WO | WO 97/26804 | 7/1997 | | |
| WO | WO 99/32105 | 7/1999 | | |

OTHER PUBLICATIONS

Kallio et al., Journal of Agricultural and Fodd Chemistry, vol. 39, 1991, pp. 1573–1577.*

Kallio, H., et al. "Thin–Layer Silver Ion Chromatography and Supercritical Fluid Chromatography of Baltic Herring (Clupea harengus membras) Triacylglycerols," Journal of Agricultural and Food Chemistry, vol. 39, 1991, pp. 1573–1577.

Nikolova–Damyanova, B., et al., "Retention Propertiesof Triacylglycerols on Silver Ion High Performance Liquid Chromatography," Journal of Chromatography, vol. 694, 1995, pp. 375–380.

International Search Report, PCT/US00/04166.

Christin, Gary D., "Chromatographic Methods", *Analytical Chemistry Fourth Edition*, John Wiley & Sons Publisher, Inc., pp. 441–484, 1986.

Christie, William W., "Preparation Of Ester Derivatives Of Fatty Acids For Chromatographic Analysis", *Advances in Lipid Methodology–Two*, The Oily Press, Dundee, United Kingdom, pp. 70–82, 1993.

Christie, W.W., "Lipid Analysis", Permgamom Press, pp. 147–149, 1976.

Elfman–Börjesson, Inger et al., "Gradients of n–Heptane and Acetonitrile In Silver–Ion High Performance Liquid Chromatography Analysis Of cis and trans Bonds in Lipids", *JAOCS.*, vol. 74, No. 9, pp. 1177–1222, 1997.

Dobson, Gary et al., "Silver Ion Chromatography Of Lipids And Fatty Acids", *Journal of Chromatography B: Biomedical Applications*, vol. 671, pp. 197–222, 1995.

Heftmann, Erich, "Argentation Chromatography", *Chromatography* Second Edition, Reinhold Publishing Corporation: New York, pp. 494–495, 1961.

Laakso, Päivi et al., "Analysis Of Triacylglycerols By Silver–Ion High–Performance Liquid Chromatography–Atmospheric Pressure Chemical Ionization Mass Spectrometry", *Lipids*, vol. 31, No. 12, pp. 1311–1321, 1996.

Nakahara, T. et al., "Production of Docosahexaenoic And Docosapentaenoic Acids By Schizochytrium sp. Isolated From Yap Islands", *JAOCS*, vol. 73, No. 11, pp. 1421–1426, 1996.

Nikolova–Damyanova, Boryana, "Silver Ion Chromatography And Lipids", *Advances In Lipid Methodology–One*, The Oily Press, pp. 181–237, 1992.

Aluminas and Other Inorganic Adsorbents, *Thin–Layer Chromatography*, Edited by Egon Stahl, Springer–Verlag Berlin, Heidelberg, New York, pp. 29, 49,396, 1969.

ChromSpher 5 Lipids, Chrompack International, pp. 1–2, 1999.

* cited by examiner

Primary Examiner—Deborah D. Carr
(74) Attorney, Agent, or Firm—Sheridan Ross P.C.

(57) ABSTRACT

This invention is directed to a process for separating a first triglyceride comprising a docosahexaenoic acid residue from a second triglyceride. The process comprises introducing a feed mixture comprising the first triglyceride and the second triglyceride into a chromatographic separation zone, and then isolating a fraction of the feed mixture in the separation zone that has a mass ratio of the first triglyceride to the second triglyceride that is greater than in the feed mixture. The separation zone comprises a stationary phase which comprises metal ions that are capable of coordinating with a double bond of a fatty acid residue of the first triglyceride to form a metal complex with the fatty acid residue.

41 Claims, No Drawings

PROCESS FOR SEPARATING A TRIGLYCERIDE COMPRISING A DOCOSAHEXAENOIC ACID RESIDUE FROM A MIXTURE OF TRIGLYCERIDES

CROSS REFERENCE TO RELATED PATENT APPLICATION

This patent claims priority from U.S. Provisional Patent Application Ser. No. 60/121,734 (filed Feb. 26, 1999). The complete text of this application is hereby incorporated herein by reference.

FIELD OF THE INVENTION

This invention relates generally to adsorptive separation of triglycerides. More specifically, this invention relates to a novel process for separating a first triglyceride comprising a docosahexaenoic acid residue from at least one other triglyceride using a chromatographic separation zone having a stationary phase which comprises metal ions that are capable of coordinating with a double bond of a fatty acid residue of the first triglyceride to form a metal complex with the fatty acid residue.

BACKGROUND OF THE INVENTION

Docosahexaenoic acids ("DHA") are 22-carbon, naturally-occurring, unbranched fatty acids containing 6 carbon—carbon double bonds. It is well known that many triglycerides comprising a DHA residue (and particularly triglycerides comprising two DHA residues) have beneficial nutritional and pharmaceutical properties. For example, such compounds may be used to treat cardiovascular and inflammatory diseases. They also may be added to infant formula to promote the development of brain and retina functions.

As used herein, a "triglyceride" is an ester of three fatty acids and glycerol, and has the general chemical formula: $CH_2(OOCR^1)CH(OOCR^2)CH_2(OOCR^3)$, wherein $OOCR^1$, $OOCR^2$, and $OOCR^3$ are each fatty acid residues. Each residue may be saturated (i.e., all the bonds between the carbons are single bonds) or unsaturated (i.e., the residue contains one or more carbon—carbon double or triple bonds), and the double bonds may each have a cis or trans configuration. To illustrate, a triglyceride having two 4, 7, 10, 13, 16, 19-DHA residues (i.e., a fatty acid residue containing 22 carbons and 6 carbon—carbon double bonds between the 4th & 5th, 7th & 8th, 10th & 11th, 13th & 14th, 16th & 17th, and 19th & 20th carbons, counting from the carbonyl group of the residue, the carbon of the carbonyl group being the first carbon counted) and one palmitic acid residue (i.e., a saturated fatty acid residue comprising 16 carbons) may have the following Formula (I) (without taking into consideration whether the double bonds have cis or trans configurations):

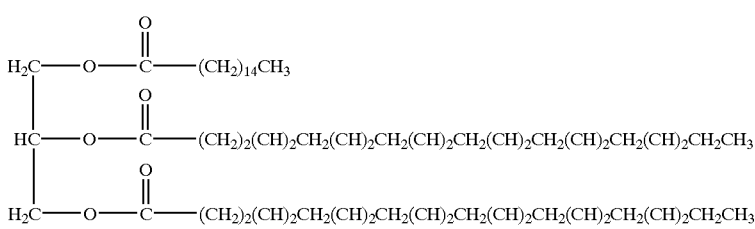

(I)

Likewise, a triglyceride having a 4, 7, 10, 13, 16, 19-DHA residue, a 4, 7, 10, 13, 16-docosapentaenoic acid ("DPA") residue (i.e., a fatty acid residue containing 22 carbons and 5 carbon—carbon double bonds between the 4th & 5th, 7th & 8th, 10th & 11th, 13th & 14th, and 16th & 17th carbons, counting from the carbonyl group of the residue, the carbon of the carbonyl group being the first carbon counted), and a palmitic acid residue may have the following formula (II) (without taking into consideration whether the double bonds have cis or trans configurations):

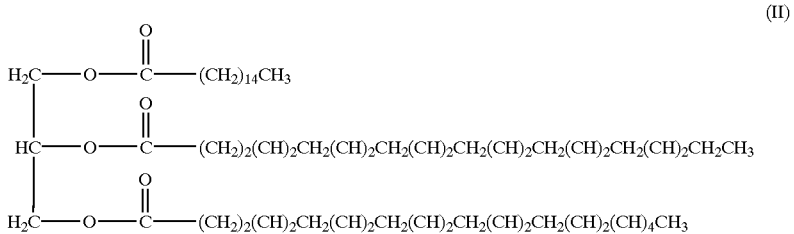

(II)

Unsaturated fatty acid residues of triglycerides are sometimes identified in the literature by an omega ("ω") number. This nomenclature is used herein. The omega number denominates the position of the first double bond, when counting from the terminal methyl group of the fatty acid residue. For example, in Formula (II), the DHA residue is an ω-3 fatty acid residue, and the DPA residue is an ω-6 fatty acid residue. Often, fatty acid residues (and particularly the DHA residues) having the most beneficial cardiovascular effects are ω-3 fatty acid residues, although other fatty acid residues (such as arachidonic acid and γ-linolenic acid, which are both ω-6 fatty acid residues) also have proven to be beneficial as well.

Sources of triglycerides containing at least one DHA residue include, but are not limited to, modified vegetable oils, marine animal oils (e.g., seal and whale blubber), fish oils (e.g., menhaden oil, salmon oil, mackerel oil, cod oil, herring oil, sardine oil, capelin oil, and tuna oil), marine algae, and human milk. Such sources, however, typically contain many other categories of compounds. These compounds include various other triglycerides containing a wide variety of fatty acid residues (e.g., the ω-6 DPA residue in Formula (II)) having varying degrees of nutritional or pharmaceutical value. It is therefore often desirable to separate a triglyceride containing at least one DHA residue (especially a triglyceride containing 2 DHA residues) from other compounds in the source before the triglyceride is used for nutritional or pharmaceutical purposes.

Numerous methods have been used alone or in combination to isolate (or at least concentrate) and recover specific fatty acids and their derivatives (i.e., esters, amides, triglycerides, etc.) from various naturally occurring sources. These processes include fractional crystallization at low temperatures, molecular distillation, urea adduct crystallization, extraction with metal salt solutions, super critical fluid fractionation on countercurrent columns, and stationary bed chromatography.

A stationary bed chromatographic system may employ a non-polar stationary phase (i.e., a reverse phase chromatographic system) or a polar stationary phase (i.e., a normal phase chromatographic system). Use of a reverse phase chromatographic system is disclosed in T. Nakahara, T. Yokochi, T. Higashihara, S. Tanaka, T. Yaguchi, & D. Honda, "Production of Docosahexaenoic and Docosapentaenoic Acids by Schizochytrium sp. Isolated from Yap Islands," *JAOCS*, vol. 73, no. 11, pp. 1421–26 (1996). Nakahara et al. report isolating four triglycerides containing DHA residues from a marine micro algae (i.e., Schizochytrium sp.) by a reverse-phase, high-performance liquid chromatographic process using an acetone/acetonitrile mobile phase and an octadecylsilane ("ODS") stationary phase. This stationary phase separates the triglycerides based on the strength of the Van der Waals forces between the stationary phase and the fatty acid residues of the triglycerides. Such a stationary phase tends to be costly relative to other conventional stationary phases (e.g., silica gel) used in normal-phase chromatography.

Others have disclosed using high performance liquid chromatography which employs a stationary phase comprising silver ions. Separation using such a column is based on the principle that a metal ion (e.g., a silver ion) will coordinate reversibly with electrons of a π orbital of a double bond between carbon atoms of an unsaturated fatty acid residue to form a metal complex with the unsaturated fatty acid residue. The strength of the complex tends to be dependent on, for example, the chain length of the fatty acid residue, the number of carbon—carbon double bonds in the residue, the positions of the double bonds, and whether the double bonds have cis or trans configurations. Although this technique has been used to separate triglycerides from mixtures of triglycerides, the types of triglycerides which have been separated by this technique have been limited to date. Application of silver ion high performance liquid chromatography to separate triglycerides has been discussed in, for example, I. Elfman-Borjesson, S. V. D. Hark, & M. Harrod, "Gradients of n-Heptane and Acetonitrile in Silver-Ion High-Performance Liquid Chromatography Analyses of cis and trans Bonds in Lipids," *JAOCS*, vol. 74, no. 9, pp. 1177–80 (1997). A separate discussion of such an application may be found in P. Laakso & P. Voutilainen, "Analysis of Triacylglycerols by Silver-Ion High-Performance Liquid Chromatography—Atmospheric Pressure Chemical Ionization Mass Spectrometry," *Lipids*, vol. 31, no. 12, pp. 1311–21 (1996). An additional separate discussion of such an application may be found in G. Dobson, W. W. Christie, & B. Nikolova-Damyanova, "Review: Silver Ion Chromatography of Lipids and Fatty Acids," *J. Chrom. B*, vol. 671, pp. 197–222 (1995). A further separate discussion of such an application may be found in B. Nikolova-Damyanova, "Silver Ion Chromatography and Lipids," *Advances in Lipid Methodology—One*, Ch. 6, pp. 182–237 (W. W. Christie, ed., The Oily Press, Ayr, Scotland, 1992).

SUMMARY OF THE INVENTION

This invention provides for a reliable and cost-effective process that may be used to separate a triglyceride comprising at least one DHA residue (and particularly triglycerides comprising two DHA residues) from its naturally occurring source, which typically contains at least one other triglyceride. This process overcomes the following primary difficulties: (1) the triglycerides involved here are highly complex molecules, and (2) there often is only a subtle difference (such as a difference of one double bond) in structure between the desired triglyceride and the other triglyceride(s) in the source.

Briefly, therefore, one embodiment of this invention is directed to a process for separating a first triglyceride comprising a docosahexaenoic acid residue from a second triglyceride. The process comprises introducing a feed mixture comprising the first triglyceride and the second triglyceride into a first chromatographic separation zone, and then isolating a first fraction of the feed mixture in the separation zone. The first fraction has a mass ratio of the first triglyceride to the second triglyceride that is greater than in the feed mixture. The separation zone comprises a stationary phase which comprises metal ions that are capable of coordinating with a double bond of a fatty acid residue of the first triglyceride.

In another embodiment of this invention directed to a process for separating a first triglyceride comprising a docosahexaenoic acid residue from a second triglyceride, the process comprises introducing a feed mixture comprising the first triglyceride and the second triglyceride into a chromatographic separation zone, and then isolating a fraction of the feed mixture in the separation zone. The fraction has a mass ratio of the first triglyceride to the second triglyceride that is greater than in the feed mixture. In this embodiment, the separation zone comprises a stationary phase which comprises silver, magnesium, or calcium ions.

A further embodiment of this invention is directed to a process for separating a first triglyceride comprising two ω-3 docosahexaenoic acid residues and a pahnitic acid residue from a second triglyceride comprising an ω-3 docosahexaenoic acid residue, an ω-6 docosapentaenoic acid residue, and a palmitic acid residue. This process first comprises introducing a feed mixture comprising the first triglyceride and the second triglyceride into a high performance liquid chromatographic column comprising a stationary phase comprising (a) silica gel, and (b) silver or magnesium ions. The first triglyceride is then eluted from the column by contacting the stationary phase with an eluent to form an eluate having a mass ratio of the first triglyceride to the second triglyceride that is greater than in the feed mixture.

Other features of this invention will be in part apparent and in part pointed out hereinafter.

DETAILED DESCRIPTION OF THE PREFERRED EMBODIMENT

In accordance with the present invention, a novel and useful process has been developed for the separation and recovery of a desired triglyceride comprising a DHA residue (and particularly a triglyceride comprising two DHA residues) from a mixture containing at least one other triglyceride. In a particularly preferred embodiment, this process comprises separating the triglycerides in a high performance chromatographic separation zone having a stationary phase which comprises metal ions that can coordinate with at least one double bond of a fatty acid residue of the desired triglyceride to form a metal complex with the fatty acid residue. This invention is especially useful for separating triglycerides from naturally occurring sources of triglycerides such as marine animal oils (e.g., seal and whale blubber), fish oils (e.g., menhaden oil, salmon oil, mackerel oil, cod oil, herring oil, sardine oil, capelin oil, and tuna oil), marine algae, and human milk. This method has been found to be particularly useful for separating triglycerides from the oil of marine micro algae (e.g., golden marine micro algae).

The triglycerides that may be separated and recovered using the method of the instant invention generally comprise at least one DHA residue, and preferably an ω-3 DHA residue. This DHA residue may be located at any of the three positions on the glycerol backbone (i.e., the residue may be $OOCR^1$, $OOCR^2$, or $OOCR^3$ in the general formula $CH_2(OOCR^1)CH(OOCR^2)CH_2(OOCR^3)$). It has been found that this method is particularly useful for separating and recovering triglycerides having two DHA residues (e.g., Formula (I) above) located in any two of the three positions on the glycerol backbone. This method is useful even if the starting mixture contains other triglycerides which comprise a DHA residue. In fact, it has been found in accordance with this invention that this method is particularly useful for separating and recovering a triglyceride having two DHA residues and a palmitic acid residue (e.g., a triglyceride having the structure of Formula (I) above) from a mixture also containing a triglyceride having a DHA residue, a DPA residue, and a palmitic acid residue (e.g., a triglyceride having the structure of Formula (II) above). And, if desired, this method may further be used to separate and recover a second triglyceride (e.g., a triglyceride having the structure of Formula (II) above) from the mixture.

Typically, unlike ion exchange column separation, the mechanism of separation here is not based on ion exchange equilibria. Instead, the separation usually is based, at least in part, on metal ions in the column coordinating reversibly with electrons of a π orbital of a double bond between carbon atoms of an unsaturated fatty acid residue of the desired triglyceride to form a metal complex with the unsaturated fatty acid residue. This complex is of the charge-transfer type; the unsaturated fatty acid residue acts as an electron donor and the silver ion acts as an electron acceptor. Thus, essentially all the metal ions typically remain in the separation zone throughout the separation.

The structure of the chromatographic separation zone used in accordance with this invention may vary widely. The separation zone may, for example, comprise a packed column or an open tubular column. In a particularly preferred embodiment, the separation zone comprises a cylindrical column packed with a porous material (i.e., the stationary phase). Because cylindrical packed columns are presently the most preferred structure for conducting the separation, most of the following discussion focuses on embodiments which use a cylindrical packed column. It should be recognized, however, that this invention is not limited to the use of cylindrical packed column separation zones. It should further be recognized that this invention may be conducted in a batch-wise or continuous manner.

The diameter and length of the column may vary widely. For example, columns having diameters as narrow as 2 mm may be used, particularly for analytical purposes. On the other hand, commercial columns may have diameters ranging from about 5 to about 60 cm or more. Preferably, the ratio of the length to the diameter is from about 5:1 to about 125:1, more preferably from about 10:1 to about 40:1, and most preferably from about 10:1 to about 25:1.

Typically, the stationary phase is in the form of particles (sometimes referred to as the "packing material"). The preferred size of these particles may vary, depending on the diameter and length of the column, as well as the shape of the particles. Smaller packing sizes normally produce better separation; however, smaller packing sizes also generally create higher pressure drop and back pressure. Thus, the particles preferably are as small as possible without creating more back pressure than can be tolerated by the structure of the chromatographic zone. In general, the preferred size of the packing ranges from about 1 to about 1000 $\mu$m in their largest dimension. For example, in one embodiment of this invention, the column has an inside diameter of from about 2 mm to about 10 mm, and the size of the particles is preferably from about 3 to about 20 $\mu$m in their largest dimension. More preferably, the size of the particles in such a column is from about 3 to about 10 $\mu$m in the largest dimension, and most preferably about 5 $\mu$m in their largest dimension. In larger columns typically used on a commercial scale (i.e., columns having diameters of from about 5 to about 60 cm), the size of the particles is preferably from about 60 to about 200 $\mu$m in their largest dimension.

The particles also preferably are regularly shaped to produce uniformity throughout the column. Typically, it is preferred that the particles be spherical because spherical particles tend to produce a tighter pack than particles having other shapes. In some situations, however, irregularly shaped particles are preferred to decrease back pressure or provide a greater surface area at a given back pressure.

The stationary phase may comprise a wide variety of materials. Preferably, the stationary phase comprises a support and metal ions. The metal ions preferably are affixed to the support so that they do not elute from the column during the separation process. It is preferred that the metal ions be capable of coordinating with a double bond of a fatty acid residue of the desired triglyceride to form a metal complex with the fatty acid residue, i.e., the metal ion preferably coordinates reversibly with electrons in a π orbital of a double bond between carbon atoms of an unsaturated fatty acid residue of the desired triglyceride to form a metal complex with the unsaturated fatty acid residue. Examples of suitable metal ions include metal ions selected from the group consisting of silver, magnesium, and calcium ions. In a particularly preferred embodiment, the metal ions comprise silver ions. In another particularly preferred embodiment, the metal ions comprise magnesium ions. It should be noted that in some instances, it may be desirable to combine different metal ions in the stationary phase, particularly to achieve a desired selectivity.

The type of support in the stationary phase may vary widely. The support may, for example, comprise borax or a cross-linked polystyrene. In a particularly preferred embodiment, the support is silica based. For example, the support may comprise a silicate. Suitable silicate supports include, for example, zeolite, calcium silicate, and magnesium silicate (e.g., $Mg_3(Si_4O_{10})(OH)_2$ ("talc") and FLORISIL® (Sigma Chemical, St. Louis, Mo.)). In a more preferred embodiment, the support comprises a silica gel. The metal ions may be bound to the silica gel, for example, by mixing the silica gel with a solution containing a salt of the metal ions. This method is well known in the art. See, e.g., U.S. Pat. No. 5,672,726 (binding silver ions to silica gel by mixing the silica gel with ethanol which contains 10 g of dissolved silver nitrate per 100 g of silica gel), which is incorporated herein by reference. In the most preferred embodiment, the support is a silica gel having ligands on its surface. An example of a suitable commercially available column containing a silica gel with ligands on its surface is the ChromSpher 5 Lipids HPLC Column from Chrompack (Raritan, N.J.). This particular column reportedly uses silver-modified, spherical silica gel. The ligands on the surface of the gel are sulfonic acid residues bound to silver ions. In one embodiment, the silica gel is saturated with the metal ions.

The separation zone also comprises a mobile phase (sometimes referred to as the "eluent"). The mobile phase preferably comprises a nonpolar solvent. Generally, it is preferred that this solvent be an unsubstituted hydrocarbon. This hydrocarbon may be a straight chain, branched, or cyclic. Examples of particularly suitable hydrocarbons include pentane, hexane, cyclohexane, isohexane, heptane, and octane.

The mobile phase may also comprise a polar solvent, such as a nitrile (e.g., acetonitrile and propionitrile), ester (e.g., ethyl acetate), ketone (e.g., acetone, methyl ethyl ketone, and methyl isoamyl ketone), dichloromethane, or chloroform. The polar solvent typically makes up no greater than about 5% by volume of the mobile phase, and more preferably from about 0.1 to about 2% by volume of the mobile phase. The purpose of the polar compound is to enhance the reversibility of the complexing between the metal ions in the column and the fatty acid residues. This, in turn, reduces (a) the retention time of the triglycerides in the separation zone, and (b) the amount of eluent needed. The polar solvent preferably does not dissolve the stationary phase or interfere with the technique used to detect the peaks in the eluate emerging from the column. It is particularly preferable, for example, to use acetonitrile as the polar component of the mobile phase when the separation is (a) conducted using a stationary phase comprising a silica gel and metal ions, and (b) ultraviolet detection is used to analyze the eluate. Water, alcohols, and amines, on the other hand, preferably are avoided when using such a system.

The separation may be isocratic (i.e., the concentration of the polar component in the mobile phase during the separation is essentially constant along the entire length of the column). Alternatively, the concentration of the polar solvent in the mobile phase entering the column may vary with time during the separation, resulting in the subsequent development of a gradient in polar solvent concentration (a) versus distance along the column, and (b) versus time at any point in the column. Such a gradient tends to narrow the range of time over which a particular triglyceride emerges from the column in the eluate, thereby increasing the concentration of the triglyceride when it emerges from the column as an eluate. If a gradient is used, the degree of change in concentration of the polar component over time preferably is constant, and the concentration of the polar component in the eluent introduced into the column preferably ranges from about 0.1% by volume near the beginning of the separation to about 5% by volume near the end of the separation. For example, when acetonitrile is used as the polar component and a concentration gradient of the acetonitrile is desired, it is preferred that the acetonitrile concentration range from about 0.1% by volume near the beginning of the separation to about 2% by volume near the end of the separation, and the preferred rate of change in acetonitrile concentration is from about 0.3 to about 5.7% by volume per hour, and more preferably from about 1 to about 3.8% by volume per hour. Generally, better resolution may be achieved using a slower rate of change in the concentration of the polar component. A slower rate of change, however, also spreads out the peaks and therefore produces a more diluted product.

The column preferably is equilibrated before conducting the separation. Equilibration typically may be achieved by passing the mobile phase alone (i.e., the nonpolar and polar solvents alone, without the triglyceride feed material) through the column for a period of time, preferably from about 15 to about 120 minutes. During equilibration, the mobile phase preferably is passed through the column at the rate used during the separation. For most columns, equilibrium may be achieved by passing from about 5 to about 20 column volumes of the mobile phase through a wet column. For example, it has been found in accordance with this invention that when using two wet Chrompack ChromSpher 5 Lipids HPLC Columns in series having 2 mm inside diameters and 250 mm lengths, the mobile phase preferably is passed through the column for about 120 minutes at 0.2 $cm^3$/min. And, for a wet ChromSpher 5 Lipids HPLC Column having a 10 mm inside diameter and a 250 mm length, the mobile phase preferably is passed through the column for about 120 minutes at 3 $cm^3$/min.

Before the triglyceride feed material is introduced into the separation zone, it preferably is first dissolved in a solvent. It is particularly preferable to dissolve the triglyceride feed material in the same nonpolar solvent as the nonpolar solvent used in the mobile phase. Thus, for example, if the mobile phase contains cyclohexane and acetonitrile, the triglyceride feed material preferably is dissolved in cyclohexane. Generally, it is preferred to dissolve the triglyceride feed material in sufficient solvent so that the concentration of the triglyceride feed material in the solvent is from about 1 to about 10 mg/ml.

Preferably after the triglyceride feed material has been dissolved in the solvent and the separation zone has been equilibrated, the triglyceride feed mixture (i.e., the solvent and the triglyceride feed material) is introduced into a mobile phase feed stream, which is subsequently introduced into the chromatographic separation zone. The preferred loading of the triglyceride feed material may vary, depending on, for example, the column size and desired degree of separation. Generally, for a column having a 10 mm inside diameter, preferably from about 0.1 mg to about 100 mg of triglyceride feed material is loaded, and most preferably about 10 mg of triglyceride feed material is loaded. Doubling the column diameter typically enables roughly four times as much triglyceride feed material to be loaded into the column.

Typically, the separation time is from about 20 minutes to about 6 hours. More preferably, the separation time is from about 20 minutes to about 2 hours. Like the preferred loading, the preferred flow rate of the mobile phase may vary, depending on, for example, the size of the column, and the desired degree of separation. It also varies, for example, on the amount of back pressure that the equipment can tolerate. Using the teachings of this specification and the general knowledge of the art, those of ordinary skill in the art can routinely determine the proper loading and flow rate.

Flow resistance of the column usually requires that the mobile phase feed stream be introduced into the column under pressure. Typically, the mobile phase stream is introduced via a moderate-pressure or high-pressure pump. This causes the mobile phase stream containing the triglyceride feed mixture to percolate through the packing and ultimately exit the column as a series of eluates. The pressure used during the separation generally does not affect the separation. The pressure should be sufficient to impart the desired flow rate of the mobile phase through the column, but preferably is not so great as to compromise the integrity of the column structure. For most columns, the preferred pressure is from about 100 to about 6000 psi, and more preferably from about 500 to about 3000 psi.

The temperature during the separation generally is not critical. It is preferred, however, to avoid temperatures which cause the mobile phase to boil or cause the triglycerides to degrade. Typically, it is preferred that the temperature be from about 0 to about 60° C., and more preferably from about 20 to about 25° C.

As an eluate emerges from the column, it may be analyzed using various quantitative or qualitative analytical devices known in the art, such as refractometers, polarimeters, and detectors (e.g., ultraviolet detectors). For example, an analysis of the eluate may be conducted using an evaporative light scattering detector (e.g., model # 750/14, Applied Chromatography Systems Ltd., Macclesfield, Cheshire, England). In a particularly preferred embodiment, the eluate is analyzed using an ultraviolet detector, such as Hewlett-Packard's Diode-Array Ultraviolet Detector (Hewlett-Packard, Palo Alto, Calif.) set at 205 nm. Using such an analysis, the eluate having the desired triglyceride composition may be isolated and recovered from the column.

In one embodiment of this invention, a second eluate also is collected to isolate and recover a second triglyceride. This triglyceride may itself be desirable, e.g., for nutritional or medical reasons. Alternatively, the second triglyceride may subsequently be hydrolyzed (i.e., the fatty acid residues of the triglycerides may be cleaved from the glycerol backbone of the triglyceride to form the corresponding free fatty acids) or transesterified (i.e., the fatty acid residues of the triglyceride may be cleaved from the glycerol backbone of the triglyceride and then used to form esters of the fatty acid residues).

Hydrolysis of the second triglyceride may be carried out by, for example, acid-catalyzed or base-catalyzed hydrolysis. In one embodiment of this invention, hydrolysis of the second triglyceride is carried out using the acid-catalyzed process comprising incubating the triglyceride at from about 20 to about 150° C. (most preferably, at about 100° C.) in a mixture containing water and a mineral acid (e.g., a mixture of water and HCl having an HCl concentration of from about 4 to about 10% by weight). The triglyceride concentration in the acid/water mixture preferably is from about 0.1 to about 10% by weight, and most preferably about 1% by weight. To perform the hydrolysis using a base, a base catalyst (e.g., KOH) is used instead of an acid catalyst. Regardless of whether the catalyst is an acid or a base, the hydrolysis preferably is performed in a non-oxidizing atmosphere (i.e., the atmosphere comprises non-oxidizing gases such as $N_2$ and/or a noble gas, and preferably consists essentially of no oxidant).

In a particularly preferred embodiment, the second triglyceride is transesterified to form alkyl esters of the fatty acid residues. Transesterification, in general, is well known in the art. See, e.g., W. W. Christie, "Preparation of Ester Derivatives of Fatty Acids for Chromatographic Analysis," *Advances in Lipid Methodology—Volume Two*, Ch. 2, pp. 70–82 (W. W. Christie, ed., The Oily Press, Dundee, United Kingdom, 1993) (incorporated herein by reference). The alkyl esters formed by the transesterification preferably are lower alkyl esters of the fatty acid residues, and more preferably methyl esters or ethyl esters of the fatty acid residues, i.e., the alkyl esters have the Formula (III):

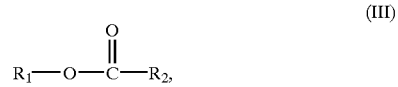

wherein $R_1$ preferably is a hydrocarbyl containing from 1 to 6 carbons, and more preferably from 1 to 2 carbons; and $R_2$ is the straight chain hydrocarbyl of the fatty acid. For example, the methyl ester of 4, 7, 10, 13, 16, 19-DHA has the Formula (IV) (without taking into consideration whether the double bonds are cis or trans):

Likewise, the ethyl ester of 4, 7, 10, 13, 16, 19-DHA has the Formula (V) (without taking into consideration whether the double bonds are cis or trans):

Ethyl esters are generally most preferred because they typically are less toxic when eaten. For example, ethyl esters typically hydrolyze to form ethanol when digested, while methyl esters typically hydrolyze to form methanol when digested.

In one embodiment of this invention, th e triglyceride is transesterified to form the alkyl esters of the fatty acid residues by acid-catalyzed transesterification wherein the triglyceride is transesterified by an alcohol in the presence of an acidic catalyst. Acid-catalyzed transesterification may be carried out, for example, by incubating a triglyceride at from about 20 to about 150° C. (most preferably, at about 100° C.) in a mixture containing the alcohol and a mineral acid (e.g., HCl), preferably under a non-oxidizing atmosphere and in the absence of water (i.e., the alcohol/acid mixture preferably consists essentially of no water). In one embodiment, the triglyceride/acid/alcohol mixture is refluxed for at least about 2 hours. In another embodiment, the triglyceride/acid/alcohol mixture is maintained at from about 20 to about 50° C. overnight. The alcohol has the formula $R_1$-OH (wherein $R_1$ is defined above for Formula III), and is selected to form the desired fatty acid ester. For example, methanol may be used to form methyl esters, and ethanol may be used to form ethyl esters. Because acid-catalyzed transesterification is typically reversible, the alcohol preferably is present in a large excess so that the reaction proceeds essentially to completion. Preferably, the triglyceride concentration in the alcohol/acid mixture is from about 0.1 to about 10% by weight, and most preferably about 1% by weight. In most cases, the acid preferably is HCl. If the acid is HCl, the concentration of HCl in the alcohol/HCl mixture preferably is from about 4 to about 10% by weight. Such a mixture may be prepared by various methods known in the art, such as bubbling dry gaseous hydrogen chloride into dry ethanol. Although HCl is most preferred, other acids may alternatively be used. One such acid is or $H_2SO_4$, which typically is used at a concentration of from about 0.5 to about 5% by weight in the alcohol. It should be noted, however, that because $H_2SO_4$ is a strong oxidizing agent, it preferably is not used with long reflux times (i.e., greater than about 6 hours), at high concentrations (i.e., greater than about 5% by weight), or at high temperatures (i.e., greater than 150° C). Another example of a suitable acid is boron trifluoride, which preferably is used at a concentration of from about 1 to about 20% by weight in the alcohol. Boron trifluoride, however, is less preferred than HCl because boron trifluoride has a greater tendency to produce undesirable byproducts.

A triglyceride alternatively may be transesterified by, for example, base-catalyzed transesterification wherein the triglyceride is transesterified by an alcohol in the presence of a basic catalyst. In this instance, the transesterifying agent may, for example, be sodium or potassium methoxide (preferably from about 0.5 to about 2 M) in anhydrous ethanol. Other bases also may be used, although bases (e.g., KOH) that react in the mixture to form water are less preferred because water tends to cause the fatty acid esters to hydrolyze to form free fatty acids.

The separation of the free fatty acids or alkyl esters resulting from the hydrolysis or transesterification of the second triglyceride may be conducted using, for example, a separation zone comprising a stationary phase which comprises metal ions that are capable of coordinating with a carbon—carbon double bond of the desired fatty acid or ester. In one preferred embodiment, the mixture containing the free fatty acids or alkyl esters is introduced into the same separation zone used initially to isolate the triglycerides, either while the triglycerides are being separated or afterwards. The mobile phase preferably comprises a nonpolar solvent (most preferably an unsubstituted hydrocarbon, such as pentane, hexane, cyclohexane, isohexane, heptane, or octane) and a polar solvent (such as acetonitrile, ethyl acetate, dichloromethane, chloroform, or acetone). The polar solvent preferably makes up no greater than about 5% by volume of the mobile phase (more preferably from about 0.1 to about 2% by volume of the mobile phase), and does not dissolve the stationary phase or interfere with the technique used to detect the peaks in the eluate emerging from the column. The separation may be isocratic or use a mobile phase containing a polar solvent concentration gradient. The preferred loading, flow rate of the mobile phase, pressure, and temperature generally fall within the same ranges as those for triglyceride separation using the same separation zone.

Other methods for separating many free fatty acids and lower alkyl esters of fatty acids from mixtures of fatty acids and lower alkyl esters of fatty acids using silver ion high performance liquid chromatography are well known in the art. A discussion showing an example of such a method may be found, for example, in I. Elfman-Borjesson, S. V. D. Hark, & M. Harrod, "Gradients of n-Heptane and Acetonitrile in Silver-Ion High-Performance Liquid Chromatography Analyses of cis and trans Bonds in Lipids," *JAOCS*, vol. 74, no. 9, pp. 1177–80 (1997) (incorporated herein by reference) (showing the separation of the ethyl ester of DHA from a 395 $\mu$g sample of fish oil that also contains the ethyl ester of eicosapentaenoic acid using a 4.6×250 mm Chrompack ChromSpher Lipids silver ion high performance liquid chromatography column, a heptane/acetonitrile mobile phase, an acetonitrile gradient of 0.1 to 0.3% by volume in the mobile phase, a mobile phase flow rate of 3 ml/min, and a separation temperature of 23 to 25° C). A separate general discussion of such separations may be found, for example, in B. Nikolova-Damyanova, "Silver Ion Chromatography and Lipids," *Advances in Lipid Methodology—One*, Ch. 6, pp. 182–237 (W. W. Christie, ed., The Oily Press, Ayr, Scotland, 1992) (incorporated herein by reference). A further separate general discussion may be. found, for example, in G. Dobson, W. W. Christie, & B. Nikolova-Damyanova, "Review: Silver Ion Chromatography of Lipids and Fatty Acids," *J. Chrom. B*, vol. 671, pp.197–222 (1995) (incorporated herein by reference).

Once the desired free fatty acid or alkyl ester has been isolated and recovered, the free fatty acid or alkyl ester itself may be used directly (e.g., for medical or nutritional purposes). Alternatively, if the isolated compound is a free fatty acid, the free fatty acid may be esterified, for example, to an alkyl ester. If on the other hand, the isolated compound is an alkyl ester, the alkyl ester may, for example, be hydrolyzed to form the corresponding free fatty acid or transesterified to form a different ester. This embodiment is particularly useful for recovering DHA residues from triglycerides in instances where the triglycerides themselves are less desirable due to the other fatty acid residues present in the triglycerides.

DEFINITIONS

Unless otherwise stated, the term "hydrocarbyl" is defined as a radical consisting exclusively of carbon and hydrogen. The hydrocarbyl may be branched or unbranched, may be saturated or unsaturated, and may comprise a ring structure.

EXAMPLES

The following examples are intended to further illustrate and explain the process of the present invention.

Example 1

Two silver ion, narrow bore chromatographic columns (i.e., a ChromSpher 5 Lipids HPLC Column from Chrompack, Raritan, NJ) in series were used analyze a DHA-rich oil extracted from golden marine micro algae (Kelco, San Diego, Calif.). This oil contains a wide range of triglycerides. Of the fatty acid residues in these triglycerides, Kelco estimated that approximately 9.1% were 14-carbon saturated fatty acid residues; approximately 22.8% were 16-carbon saturated fatty acid residues; approximately 2.4% were ω-6, 20-carbon fatty acid residues with 3 double bonds; approximately 2.2% were ω-3, 20-carbon fatty acid residues with 5 double bonds; approximately 16.2% were ω-6, 22-carbon fatty acid residues with 5 double bonds (DPA); and approximately 40.9% were ω-3, 22-carbon fatty acid residues with 6 double bonds (DHA).

The columns each had a length of 250 mm (i.e., the total length of the two columns was 500 mm) and an interior diameter of 2 mm. The packing was silver-modified, ligand-covered spherical silica. The mobile phase contained 1.0% acetonitrile in cyclohexane. The separation was conducted at a temperature of approximately 22° C. Before conducting the separation, the columns were first equilibrated by running the mobile phase through the columns at a flow rate of 0.2 ml/min. for about 2 hours. The triglyceride feed material was introduced into the column as a mixture containing 1 mg/ml of the DHA-rich oil in cyclohexane. Approximately 10 μl of this mixture was injected into the mobile phase feed stream while maintaining the mobile phase flow rate at 0.2 ml/min. The eluate was then analyzed using a Hewlett-Packard Diode-Array Ultraviolet Detector set at 205 nm. Two major peaks appeared in the eluate at approximately 24.4 minutes and at approximately 30.3 minutes. The peaks had no overlap with each other.

Due to the small amount of sample analyzed in this experiment, the composition of the peaks could not be analyzed. Thus, a second experiment was conducted using a larger column and a larger amount of sample to determine the composition of these peaks. The second experiment is discussed in Example 2.

Example 2

A silver ion, chromatographic column (i.e., a Chrompack ChromSpher 5 Lipids HPLC Column) was used to isolate and recover a triglyceride having two 4, 7, 10, 13, 16, 19-DHA residues and one palmitic acid residue from the Kelco DHA-enriched oil (described in Example 1 above), and particularly to isolate and recover the triglyceride from a mixture additionally containing a triglyceride having a 4, 7, 10, 13, 16, 19-DHA residue, a 4, 7, 10, 13, 16-DPA residue, and a palmitic acid residue. This separation was conducted at a temperature of approximately 22° C. The column had a length of 250 mm and an interior diameter of 10 mm. The mobile phase contained 1.0% acetonitrile in n-hexane. Before the separation was conducted, the column first was equilibrated by running the mobile phase through the column at a flow rate of 3 ml/min. for about 2 hours. The triglyceride feed material was introduced into the column as a mixture containing 10 mg/ml of the DHA-rich oil in n-hexane. More specifically, approximately four 200 μl samples of this mixture (i.e., a total of about 8 mg of triglycerides) were injected into the mobile phase feed stream while maintaining the mobile phase flow rate at 3 ml/min. The eluate was then analyzed using a Hewlett-Packard Diode-Array Ultraviolet Detector set at 205 nm. Two large peaks appeared in the eluate that corresponded to those obtained in the analytical column in Example 1. These peaks had no overlap with each other. About 1.5 mg were collected from the first peak, and about 3.5 mg were collected from the second peak.

To determine the composition of the two peaks, the collected portions of the peaks were each analyzed by electrospray tandem mass spectrometric characterization. In particular, the peaks were dissolved in 10 mM ammonium acetate to form sample solutions containing 10 μg of triglycerides per ml of solution. Approximately 4 μl per minute of each sample solution was fed into a Sciex API-III ES/MSIMS mass spectrometer (Toronto, Canada) using a multiplier of −6000 volts, an ionspray voltage of 5000 volts, and a 60 volt orifice. This analysis showed that the triglyceride in the first peak had a total molecular weight matching that of a triglyceride having a DHA residue, a DPA residue, and a palmitic acid residue. It also showed that the triglyceride in this peak contained a constituent having a molecular weight matching that of a palmitic acid residue, a constituent having a molecular weight matching that of a DPA residue, and a constituent having a molecular weight matching that of DHA. The triglyceride in the second peak, on the other hand, had a total molecular weight matching that of a triglyceride having two DHA residues and a palmitic acid residue. The triglyceride also contained a constituent having a molecular weight matching that of a palmitic acid residue and a constituent having a molecular weight matching that of a DHA residue.

To determine if the DHA residues in the triglycerides of both peaks were 4, 7, 10, 13, 16, 19-DHA residues and that the DPA residue in the first peak was a 4, 7, 10, 13, 16-DPA residue, a sample of the Kelco DHA-rich oil was transesterified and passed through a silver ion chromatographic column to produce a separation, which, in turn, was compared to the silver ion chromatographic separation results of commercially available standards of 4, 7, 10, 13, 16, 19-DHA and 4, 7, 10, 13, 16-DPA methyl esters (Matreya, Inc., Pleasant Gap, Pa.). More specifically, approximately 100 mg of the Kelco DHA-rich acid was incubated in 2.0 ml of 4% HCl in methanol for 2 hours at 100° C. to transesterify the triglycerides in the oil (i.e., the fatty acid residues of the triglycerides were cleaved from the glycerol backbones of the triglycerides to form methyl esters of the fatty acid residues). Approximately 1.0 ml of toluene was added, and the mixture was allowed to stand at 100° C. for another hour. Next, the mixture was partitioned between 2 ml of $H_2O$ and 2 ml hexane. The hexane fraction yielded 80 mg of yellow oil. Approximately 10 μl of the yellow oil was introduced into two silver ion, narrow bore chromatographic columns (i.e., ChromSpher 5 Lipids HPLC Columns having inner diameters of 2 mm and lengths of 250 mm) in series at a temperature of approximately 22° C. The mobile phase contained 1.0% acetonitrile in cyclohexane, and had been passed through the columns at a flow rate of 0.2 ml/min. for about 2 hours beforehand to equilibrate the columns. The flow rate during the separation also was 0.2 ml/min. Two major peaks were eluted at approximately 10 and 12 minutes. These peak times corresponded to the peak times obtained when the Matreya standard samples were passed through the column under the same column conditions.

The above description of the preferred embodiment is intended only to acquaint others skilled in the art with the invention, its principles, and its practical application, so that others skilled in the art may adapt and apply the invention in its numerous forms, as may be best suited to the requirements of a particular use. The present invention, therefore, is not limited to the above embodiments, and may be variously modified.

We claim:

1. A process for separating a first triglyceride comprising a docosahexaenoic acid residue from a second triglyceride, said process comprising:

introducing a feed mixture containing triglycerides from marine algae comprising said first triglyceride and said second triglyceride into a first chromatographic separation zone; and isolating a first fraction of said feed mixture in said first separation zone, said first fraction having a mass ratio of said first triglyceride to said second triglyceride that is greater than in said feed mixture,
   wherein said first separation zone comprises a stationary phase which comprises metal ions that are capable of coordinating with a double bond of a fatty acid residue of said first triglyceride.

2. A process of claim 1 further comprising recovering said first fraction by elution of said first fraction from said first separation zone.

3. A process of claim 1 wherein said feed mixture contains triglycerides from golden marine micro algae.

4. A process of claim 1 wherein said first triglyceride comprises two docosahexaenoic acid residues.

5. A process of claim 1 wherein said second triglyceride comprises a docosahexaenoic acid residue.

6. A process of claim 5 wherein said second triglyceride comprises only one docosahexaenoic acid residue.

7. A process of claim 5 further comprising isolating a second fraction of said feed mixture in said first separation zone, said second fraction comprising said second triglyceride.

8. A process of claim 5 further comprising:
   isolating a second fraction of said feed mixture in said first separation zone, said second fraction comprising said second triglyceride;
   transesterifying said second triglyceride obtained in said second fraction to form an alkyl ester mixture comprising an alkyl ester of said docosahexaenoic acid residue and an alkyl ester of a second fatty acid;
   introducing said alkyl ester mixture into a second chromatographic separation zone; and
   isolating a fraction of said alkyl ester mixture in said second separation zone, said fraction of said alkyl ester mixture having a mass ratio of said alkyl ester of said docosahexaenoic acid residue to said alkyl ester of said second fatty acid that is greater than in said alkyl ester mixture,
      wherein said second separation zone comprises a stationary phase that comprises metal ions that are capable of coordinating with a double bond of said alkyl ester of said docosahexaenoic acid residue.

9. A process of claim 8 wherein said second separation zone comprises a stationary phase that comprises silver ions.

10. A process of claim 8 wherein said second separation zone comprises a stationary phase that comprises magnesium ions.

11. A process of claim 8 further comprising recovering said fraction of said alkyl ester mixture by elution of said fraction of said alkyl ester mixture from said second separation zone.

12. A process of claim 8 wherein said alkyl esters comprise methyl esters.

13. A process of claim 8 wherein said alkyl esters comprise ethyl esters.

14. A process of claim 8 wherein said second fatty acid is docosapentaenoic acid.

15. A process of claim 5 further comprising:
   isolating a second fraction of said feed mixture in said first separation zone, said second fraction comprising said second triglyceride;
   hydrolyzing said second triglyceride obtained in said second fraction to form a fatty acid mixture comprising docosahexaenoic acid and a second fatty acid;
   introducing said fatty acid mixture into a second chromatographic separation zone; and
   isolating a fraction of said fatty acid mixture in said second separation zone, said fraction of said fatty acid mixture having a mass ratio of docosahexaenoic acid to said second fatty acid that is greater than in said fatty acid mixture,
      wherein said second separation zone comprises a stationary phase which comprises metal ions that are capable of coordinating with a double bond of docosahexaenoic acid.

16. A process of claim 15 wherein said second separation zone comprises a stationary phase that comprises silver ions.

17. A process of claim 15 wherein said second separation zone comprises a stationary phase that comprises magnesium ions.

18. A process of claim 15 wherein said second fatty acid is docosapentaenoic acid.

19. A process of claim 5 further comprising:
   isolating a second fraction of said feed mixture in said first separation zone, said second fraction comprising said second triglyceride;
   transesterifying said second triglyceride obtained in said second fraction to form an alkyl ester mixture comprising an alkyl ester of said docosahexaenoic acid residue and an alkyl ester of a second fatty acid;
   recycling said alkyl ester mixture back to said first chromatographic separation zone; and
   isolating a fraction of said recycled alkyl ester mixture in said first separation zone, said fraction of said recycled alkyl ester mixture having a mass ratio of said alkyl ester of said docosahexaenoic acid residue to said alkyl ester of said second fatty acid that is greater than in said recycled alkyl ester mixture.

20. A process of claim 19 wherein said alkyl ester mixture is recycled back to said first chromatographic separation zone while said feed mixture is being introduced into said first chromatographic separation zone.

21. A process of claim 19 wherein said alkyl ester mixture is recycled back to said first chromatographic separation zone after all said feed mixture is introduced into said first chromatographic separation zone.

22. A process of claim 19 wherein said second fatty acid is docosapentaenoic acid.

23. A process of claim 5 further comprising:
   isolating a second fraction of said feed mixture in said first separation zone, said second fraction comprising said second triglyceride;
   hydrolyzing said second triglyceride obtained in said second fraction to form a fatty acid mixture comprising docosahexaenoic acid and a second fatty acid;
   recycling said fatty acid mixture back to said first chromatographic separation zone; and
   isolating a fraction of said recycled fatty acid mixture in said first separation zone, said fraction of said recycled fatty acid mixture having a mass ratio of docosahexaenoic acid to said second fatty acid that is greater than in said recycled fatty acid mixture.

24. A process of claim 23 wherein said fatty acid mixture is recycled back to said first chromatographic separation zone while said feed mixture is being introduced into said first chromatographic separation zone.

25. A process of claim 23 wherein said fatty acid mixture is recycled back to said first chromatographic separation zone after all said feed mixture is introduced into said first chromatographic separation zone.

26. A process of claim 23 wherein said second fatty acid is docosapentaenoic acid.

27. A process of claim 1 wherein said second triglyceride comprises a docosapentaenoic acid residue.

28. A process of claim 1 wherein said second triglyceride comprises a docosahexaenoic acid residue and a docosapentaenoic acid residue.

29. A process of claim 1 wherein said first triglyceride comprises two docosahexaenoic acid residues and apalmitic acid residue; and said second triglyceride comprises a docosahexaenoic acid residue, a docosapentaenoic acid residue, and a palmitic acid residue.

30. A process of claim 1 wherein said first triglyceride comprises two ω-3 docosahexaenoic acid residues, and said second triglyceride comprises an ω-3 docosahexaenoic acid residue and an ω-6 docosapentaenoic acid residue.

31. A process of claim 1 wherein said stationary phase further comprises a material selected from the group consisting of borax, cross-linked polystyrene, and silicate.

32. A process of claim 1 wherein said stationary phase further comprises a material selected from the group consisting of zeolite, calcium silicate, and magnesium silicate.

33. A process of claim 1 wherein said stationary phase further comprises silica gel.

34. A process of claim 33 wherein said stationary phase comprises silica gel having sulfonic acid residues bound to said metal ions.

35. A process for separating a first triglyceride comprising a docosahexaenoic acid residue from a second triglyceride, said process comprising:
  introducing a feed mixture comprising said first triglyceride and said second triglyceride into a chromatographic separation zone; and
  isolating a fraction of said feed mixture in said separation zone, said fraction of said feed mixture having a mass ratio of said first triglyceride to said second triglyceride that is greater than in said feed mixture,
    wherein said separation zone comprises a stationary phase which comprises magnesium ions.

36. A process of claim 35 wherein said stationary phase further comprises a material selected from the group consisting of borax, cross-linked polystyrene, and silicate.

37. A process of claim 35 wherein said stationary phase further comprises silica gel.

38. A process of claim 35 wherein said first triglyceride comprises two ω-3 docosahexaenoic acid residues, and said second triglyceride comprises an ω-3 docosahexaenoic acid residue and an ω-6 docosapentaenoic acid residue.

39. A process for separating a first triglyceride comprising a docosahexaenoic acid residue from a second triglyceride comprising a docosahexaenoic acid residue, said process comprising:
  introducing a feed mixture comprising said first triglyceride and said second triglyceride into a first chromatographic separation zone;
  isolating a first fraction of said feed mixture in said first separation zone, said first fraction having a mass ratio of said first triglyceride to said second triglyceride that is greater than in said feed mixture,
    wherein said first separation zone comprises a stationary phase which comprises metal ions that are capable of coordinating with a double bond of a fatty acid residue of said first triglyceride;
  isolating a second fraction of said feed mixture in said first separation zone, said second fraction comprising said second triglyceride;
  transesterifying said second triglyceride obtained in said second fraction to form an alkyl ester mixture comprising an alkyl ester of said docosahexaenoic acid residue and an alkyl ester of a second fatty acid;
  introducing said alkyl ester mixture into a second chromatographic separation zone; and
  isolating a fraction of said alkyl ester mixture in said second separation zone, said fraction of said alkyl ester mixture having a mass ratio of said alkyl ester of said docosahexaenoic acid residue to said alkyl ester of said second fatty acid that is greater than in said alkyl ester mixture,
    wherein said second separation zone comprises a stationary phase that comprises metal ions that are capable of coordinating with a double bond of said alkyl ester of said docosahexaenoic acid residue.

40. A process for separating a first triglyceride comprising a docosahexaenoic acid residue from a second triglyceride comprising a docosahexaenoic acid residue, said process comprising:
  introducing a feed mixture comprising said first triglyceride and said second triglyceride into a first chromatographic separation zone;
  isolating a first fraction of said feed mixture in said first separation zone, said first fraction having a mass ratio of said first triglyceride to said second triglyceride that is greater than in said feed mixture,
    wherein said first separation zone comprises a stationary phase which comprises metal ions that are capable of coordinating with a double bond of a fatty acid residue of said first triglyceride;
  isolating a second fraction of said feed mixture in said first separation zone, said second fraction comprising said second triglyceride;
  hydrolyzing said second triglyceride obtained in said second fraction to form a fatty acid mixture comprising docosahexaenoic acid and a second fatty acid;
  introducing said fatty acid mixture into a second chromatographic separation zone; and
  isolating a fraction of said fatty acid mixture in said second separation zone, said fraction of said fatty acid mixture having a mass ratio of docosahexaenoic acid to said second fatty acid that is greater than in said fatty acid mixture,
    wherein said second separation zone comprises a stationary phase which comprises metal ions that are capable of coordinating with a double bond of docosahexaenoic acid.

41. A triglyceride composition produced by the process of claim 1.

* * * * *